(12) United States Patent
O'Keeffe et al.

(10) Patent No.: US 8,923,465 B2
(45) Date of Patent: Dec. 30, 2014

(54) METHOD FOR SAMPLING DATA AND APPARATUS THEREFOR

(75) Inventors: Conor O'Keeffe, Douglas (IE); Kiyoshi Kase, Austin, TX (US); Paul Kelleher, Aherla (IE)

(73) Assignee: Freescale Semiconductor, Inc., Austin, TX (US)

( * ) Notice: Subject to any disclaimer, the term of this patent is extended or adjusted under 35 U.S.C. 154(b) by 1106 days.

(21) Appl. No.: 12/988,831

(22) PCT Filed: May 19, 2008

(86) PCT No.: PCT/IB2008/051950
§ 371 (c)(1),
(2), (4) Date: Oct. 21, 2010

(87) PCT Pub. No.: WO2009/141680
PCT Pub. Date: Nov. 26, 2009

(65) Prior Publication Data
US 2011/0043253 A1    Feb. 24, 2011

(51) Int. Cl.
*H04L 7/00*    (2006.01)
*H04L 7/033*    (2006.01)

(52) U.S. Cl.
CPC .................................. *H04L 7/0337* (2013.01)
USPC ........... 375/371; 375/294; 375/316; 375/327; 375/373; 375/376

(58) Field of Classification Search
CPC ..... H04L 7/033; H04L 7/0025; H04L 7/0337; H04L 7/0338; H04L 1/0054; H03L 7/091; H03L 7/0814; H03L 7/087; H03L 7/0998; H03L 7/0996

USPC ......... 375/135, 215, 294, 295, 316, 326, 327, 375/354, 371, 373, 375, 376
See application file for complete search history.

(56) References Cited

U.S. PATENT DOCUMENTS

| | | | |
|---|---|---|---|
| 4,756,011 A | 7/1988 | Cordell | |
| 5,699,389 A | 12/1997 | Beladi | |
| 6,545,507 B1 * | 4/2003 | Goller | ............................. 326/93 |
| 6,850,580 B1 | 2/2005 | Naoe | |

(Continued)

FOREIGN PATENT DOCUMENTS

| | | |
|---|---|---|
| EP | 1545046 A | 6/2005 |
| WO | 2005/034355 A2 | 4/2005 |

OTHER PUBLICATIONS

International Search Report and Written Opinion correlating to PCT/IB2008/051950 dated Mar. 3, 2009.

*Primary Examiner* — Hirdepal Singh

(57) ABSTRACT

A semiconductor device comprises sampling logic, comprising: input sample path selection logic arranged to enable at least one input sample path; sampler logic arranged to receive and sample an input data signal in a serial data stream in accordance with a phase of the at least one enabled input sample path; and transition detection logic arranged to detect transitions within the received input data signal. The input sample path selection logic is further arranged, upon detection of a transition within the received input data signal, to determine if the phase of the at least one input sample path is a phase having a largest window between logic values; and if it is determined that the phase of the at least one input sample path is not the phase having a largest window between logic values, to enable at least one input sample path comprising a more appropriate phase.

19 Claims, 8 Drawing Sheets

(56) References Cited

U.S. PATENT DOCUMENTS

| | | |
|---|---|---|
| 7,203,260 B2 | 4/2007 | Moon et al. |
| 7,684,531 B2 * | 3/2010 | Masui et al. ............... 375/355 |
| 7,940,877 B1 * | 5/2011 | Oh et al. .................... 375/371 |
| 7,957,497 B2 * | 6/2011 | Bae ............................ 375/355 |
| 8,120,395 B2 * | 2/2012 | Williams et al. ........... 327/156 |
| 8,189,729 B2 * | 5/2012 | Hoang et al. ............... 375/373 |
| 2002/0054409 A1 * | 5/2002 | Bartur et al. ............... 359/152 |
| 2005/0207520 A1 * | 9/2005 | Su et al. ..................... 375/355 |
| 2006/0109942 A1 * | 5/2006 | Vallet ......................... 375/355 |
| 2006/0188043 A1 * | 8/2006 | Zerbe et al. ................. 375/346 |
| 2007/0025483 A1 * | 2/2007 | Emami-Neyestanak et al. ............................ 375/355 |
| 2009/0196387 A1 * | 8/2009 | McCune, Jr. ............... 375/355 |
| 2009/0279654 A1 * | 11/2009 | Konishi et al. ............. 375/362 |

\* cited by examiner

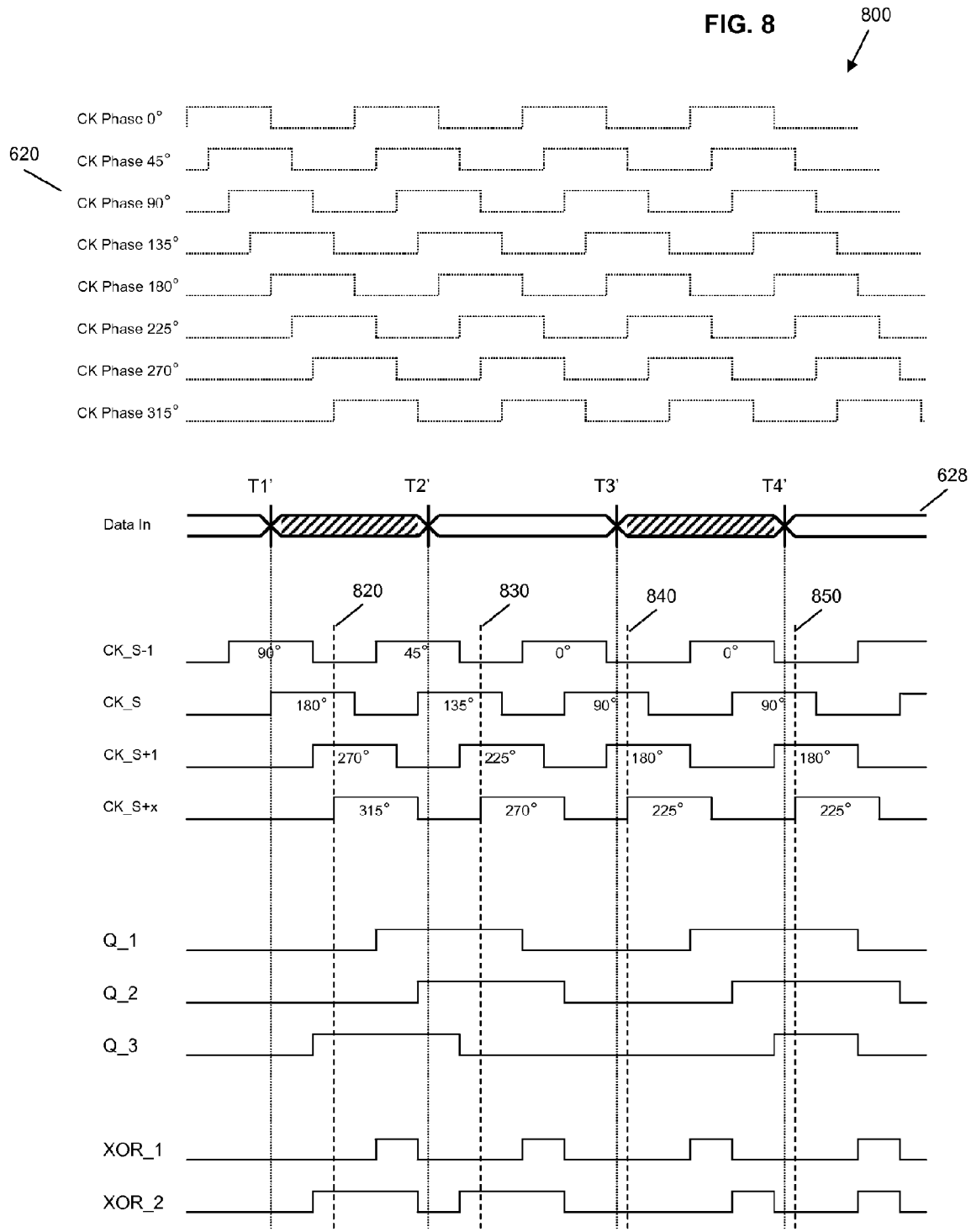

METHOD FOR SAMPLING DATA AND APPARATUS THEREFOR

FIELD OF THE INVENTION

The field of the invention relates to a method for sampling data and apparatus therefor, and in particular to a method and apparatus for sampling data to enable clock data recovery.

BACKGROUND OF THE INVENTION

Wireless communication devices, such as mobile phone handsets, require a very high level of integration of hardware and firmware/software in order to achieve the necessary density of functionality, i.e. to realise the necessary functionality in a small device volume and at a low cost. Another requirement for wireless communication device design is to have low power consumption in order to increase the battery call time and/or stand-by time.

Wireless communication devices also incorporate a number of distinct and operably coupled sub-systems, in order to provide the wide variety of functions and operations that a complex wireless communication device needs to perform. Such sub-systems may comprise radio frequency power amplification functions, radio frequency integrated circuits (RFIC) comprising radio frequency generation, amplification, filtering logic, etc, as well as baseband integrated circuits (BBIC) comprising audio circuits, encoding/decoding, (de)modulation functions, processing logic, etc. and memory units.

Interfaces, which are often standardised to allow commonality and increased functionality between different chip-set manufacturers and different handset manufacturers, are defined for communicating between the respective sub-systems.

In the field of mobile communication devices, a standardisation body, the MIPI (Mobile Industry Processor Interface) Alliance, consisting primarily of semiconductor and mobile phone manufacturers has been formed to define various sub-system interfaces. Standardisation efforts within the MIPI Alliance include the DigRF working group, which is focused on developing specifications for interfaces between wireless mobile RFICs (Radio Frequency Integrated Circuits) and BBICs (BaseBand Integrated Circuits), and the Physical Layer (PHY) working group, which is charted with specifying high-speed physical layer designs to support multiple application requirements, such as the M-PHY layer, a high speed, embedded clock design.

DigRF utilises the M-PHY physical layer to transport air interface sample information between Integrated Circuits (ICs). The MIPI DigRF and M-PHY standards ensure that compliant RF and baseband ICs can communicate directly with each other. This removes the need for an intermediate mixed signal device. The standard places few constraints on the internal architectures of the ICs, to maximise scope for suppliers to differentiate through innovation and design. Likewise the MIPI Unified Protocol (Unipro) standard can utilise the MIPI M-PHY standard to communicate information between such devices as an applications processor and an imaging or camera sub-system.

Within the MIPI DigRF parlance, the transmit data is referred to as 'TxData' in a direction from the BBIC to the RFIC and the receive data is referred to as 'RxData' routed in a direction from the RFIC to the BBIC.

Data transmission between a baseband (BB) line drive and RF line receiver is asynchronous in nature. Consequently, the uplink controller does not have any knowledge about the correct clock phase to be used for extracting the data. Thus, a synchronization pattern is transmitted close to the start of a frame to facilitate synchronization.

Either a phase picking or CDR (clock data recovery) system is required to sample the data correctly. In a CDR system the embedded clock is derived from the data stream and used to sample the incoming stream. As a result, CDR mechanisms are a key functional element of the interface mechanism.

The receiving end of the interface is required to provide a means of adjusting the phase sample of the selected clock speed (which may, for example, be running at 1248 MHz or 2496 MHz for high speed), so as to centre the data sampling point in the centre of the data bit period, as understood by those skilled in the art, and hence ensure reliable communication.

One option available is to make use of an embedded clock signal in the data stream. The embedded clock can be used for alignment of the sample clock on the receive side of the interface. Clock Data Recovery (CDR) techniques can be employed to extract the transmit clock from the received data stream. CDR techniques are exploited extensively in modern serial communication links to minimise errors on the links. The primary purpose of the CDR is to recover the clock signal, or the phase of the clock signal, in order to optimally sample the incoming data stream, and thereby ensure a low BER (Bit Error Rate). The CDR is responsible for tracking incoming data over a range of bit-rates.

SUMMARY OF THE INVENTION

In accordance with aspects of the invention, there is provided a semiconductor device and a wireless communication device comprising sampling logic for sampling data and a method for sampling data as defined in the appended Claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

FIG. 8 illustrates another example of a timing diagram for sampling logic.

DESCRIPTION OF EMBODIMENTS

Examples of embodiments of the invention will be described in terms of a system-on-chip (SoC) semiconductor device comprising sampling logic for sampling data.

Although embodiments of the invention will be described in terms of a system-on-chip (SoC), it will be appreciated that the features herein described may be embodied in any apparatus that incorporates sampling logic for sampling data.

Figure 2:
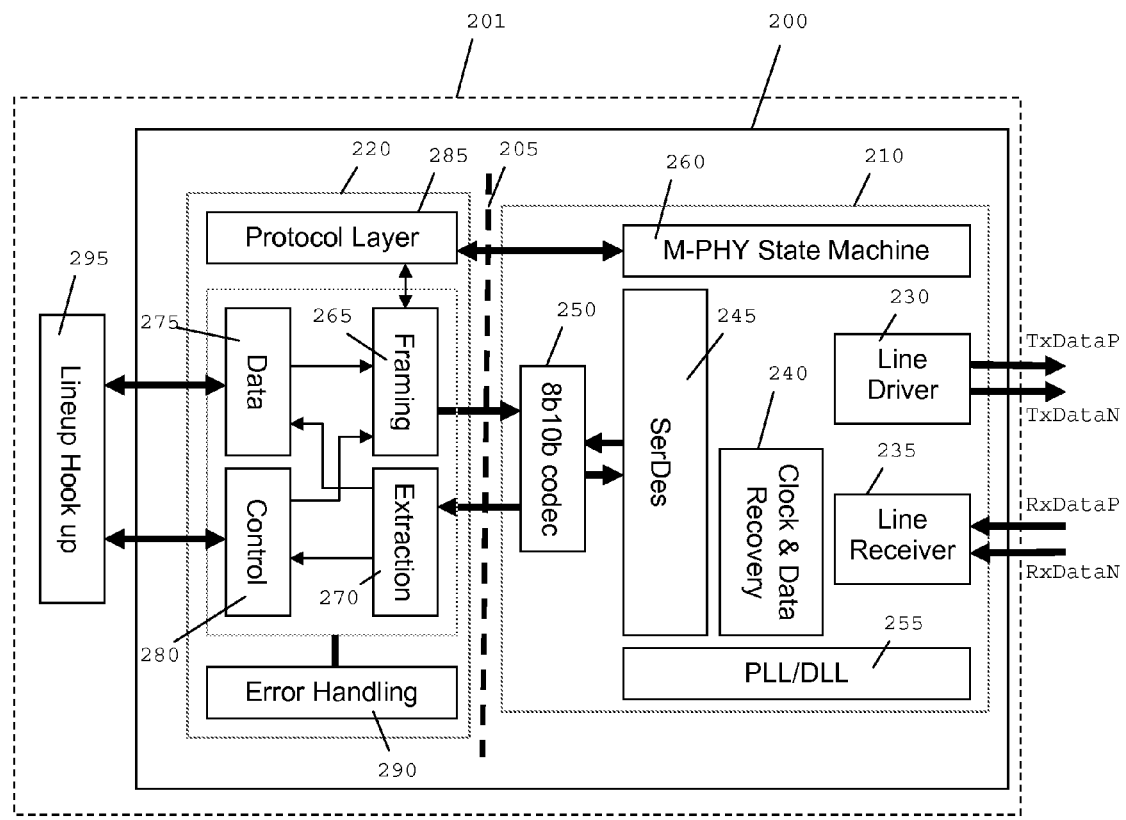
FIG. 2 illustrates a block diagram of an example of a data sampling circuit of a wireless communication device.

Referring to the example of FIG. 2, a semiconductor device may comprise sampling logic, the sampling logic comprising: input sample path selection logic arranged to enable at least one input sample path; sampler logic arranged to receive and sample an input data signal in a serial data stream in accordance with a phase of at least one enabled input sample path; and transition detection logic arranged to detect transitions within the received input data signal. The input sample path selection logic is further arranged, upon detection of a transition within the received input data signal, to determine if the phase of the at least one input sample path is useful, referred to hereinafter as 'optimally valid'; and if it is determined that the phase of the at least one input sample path is not optimally valid, to enable at least one input sample path comprising a more useful/optimally valid phase, namely a phase having a larger window between logic values.

Figure 1:
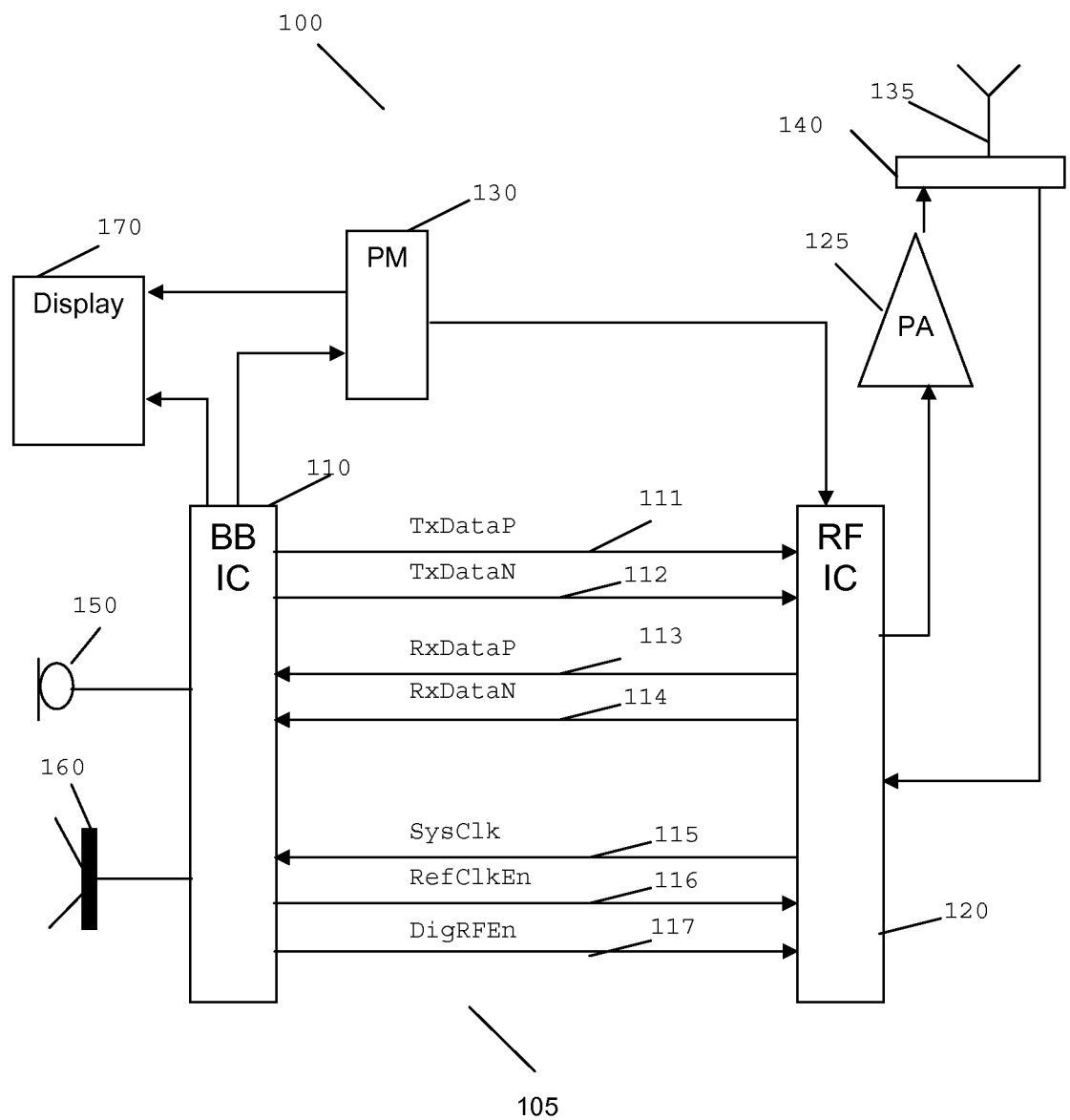
FIG. 1 illustrates a simplified block diagram of part of an example of a wireless communication device.

Referring first to FIG. 1, there is shown a simplified block diagram of part of a wireless communication device 100, adapted according to some embodiments of the invention. The wireless communication device 100, in the context of the illustrated embodiments of the invention, may be a multi-mode 3G mobile telephone. As such, the wireless communication device 100 may comprise an antenna 135, coupled to a 3G duplex filter or antenna switch 140, which provides isolation between receive and transmit chains within the wireless communication device 100. The receiver chain, as known in the art, may include numerous receiver circuitries, such as receiver front-end circuitry effectively providing reception, filtering and intermediate or base-band frequency conversion (not shown). The receiver circuitry may be predominantly formed on a radio frequency integrated circuit (RFIC) 120. The RFIC 120 may be coupled to a number of other elements/functions (not shown) such as signal processing logic, memory elements, etc.

The RFIC 120 may be operably coupled to a baseband integrated circuit (BBIC) 110 that performs a number of signal processing operations at baseband frequencies, such as decoding/encoding, (de)modulation, (de-)interleaving functions and the like. The BBIC 110 may be coupled to a number of other logic elements/functions (not shown), such as signal processing logic, memory elements, etc. The BBIC 110 may comprise a timer or clock function (not shown), or may be operably coupled to an external timer or clock, to control a timing of operations (transmission or reception of time-dependent signals) within the wireless communication device 100.

The coupling between the RFIC 120 and the BBIC 110 may be implemented via a RFIC-BBIC data interface 105, such as a fourth generation (4G) DigRF interface, which in the illustrated example comprises seven pins to carry electrical signals there between. The seven pins may comprise a differential TX path (TxDataP line 111, TxDataN line 112), differential RX path (RxDataP line 113, RxDataN line 114); single ended reference clock (SysClk) line 115, a single ended system clock enable (RefClkEn) line 116 and a single ended interface enable (DigRFEn) line 117. For some classes of mobile applications, such as LTE (Long Term evolution), additional paths between RFIC and BBIC may be added to carry the required data payload between ICs.

It is envisaged that the BBIC 110 may be operably coupled to a plurality of RFICs 120 (not shown). The BBIC may also be coupled to one or more output devices, such as audio speaker 160 and/or display 170.

As regards the transmit chain of the wireless communication device 100, this includes an input device, such as a microphone 150 and/or keypad (not shown), coupled to the BBIC 110. The RFIC 120, when operating in a transmit function, may be coupled to a radio frequency power amplifier 125 and thereafter to the antenna 135 via the antenna switch or duplex filter 140. A voltage regulator (not shown) associated with the RFIC 120 may form part of a power management unit 130, with the BBIC 110 maintaining control of the power management unit 130.

The BBIC-RFIC interface, and therefore the BBIC and RFIC devices, may be adapted to function using improved sampling logic, as described below.

Referring now to FIG. 2, a block diagram of, for example, a RFIC-BBIC data interface 200 of a wireless communication device is illustrated in accordance with embodiments of the invention, some or all of which may be provided within a semiconductor device 201. For the illustrated example, the data interface 200 comprises M-PHY physical layer 210 and a protocol layer 220, which are separated by a Service Access Point (SAP) 205. The M-PHY physical layer 210 comprises a Line Driver 230 operably coupled to a differential TX path (TxDataP line and TxDataN line) and a Line Receiver 235 operably coupled to a differential RX path (RxDataP line and RxDataN line). The M-PHY physical layer further comprises clock and data recovery logic 340, which comprises sampling logic as described in greater detail below.

For completeness, the M-PHY physical layer 210 of FIG. 2 also comprises SerDes logic 245 which performs the serial to parallel conversion and conversely the parallel to serial conversion of the digital data stream transported on the inter-chip interface, and 8-bit to 10-bit (8b10b) codec logic 250, PLL (Phase Lock Loop) and DLL (Delay Lock Loop) logic 255 and M-PHY state machine logic 260. The protocol layer 220 of FIG. 2 comprises framing logic 265 arranged to build frames for transmission by the Line Driver 230, and extraction logic 290 arranged to extract information from frames received by the Line Receiver 235. The protocol layer 220 further comprises data storage 275 and control storage 280, error handling logic 290 and protocol layer logic 285.

Figure 3:
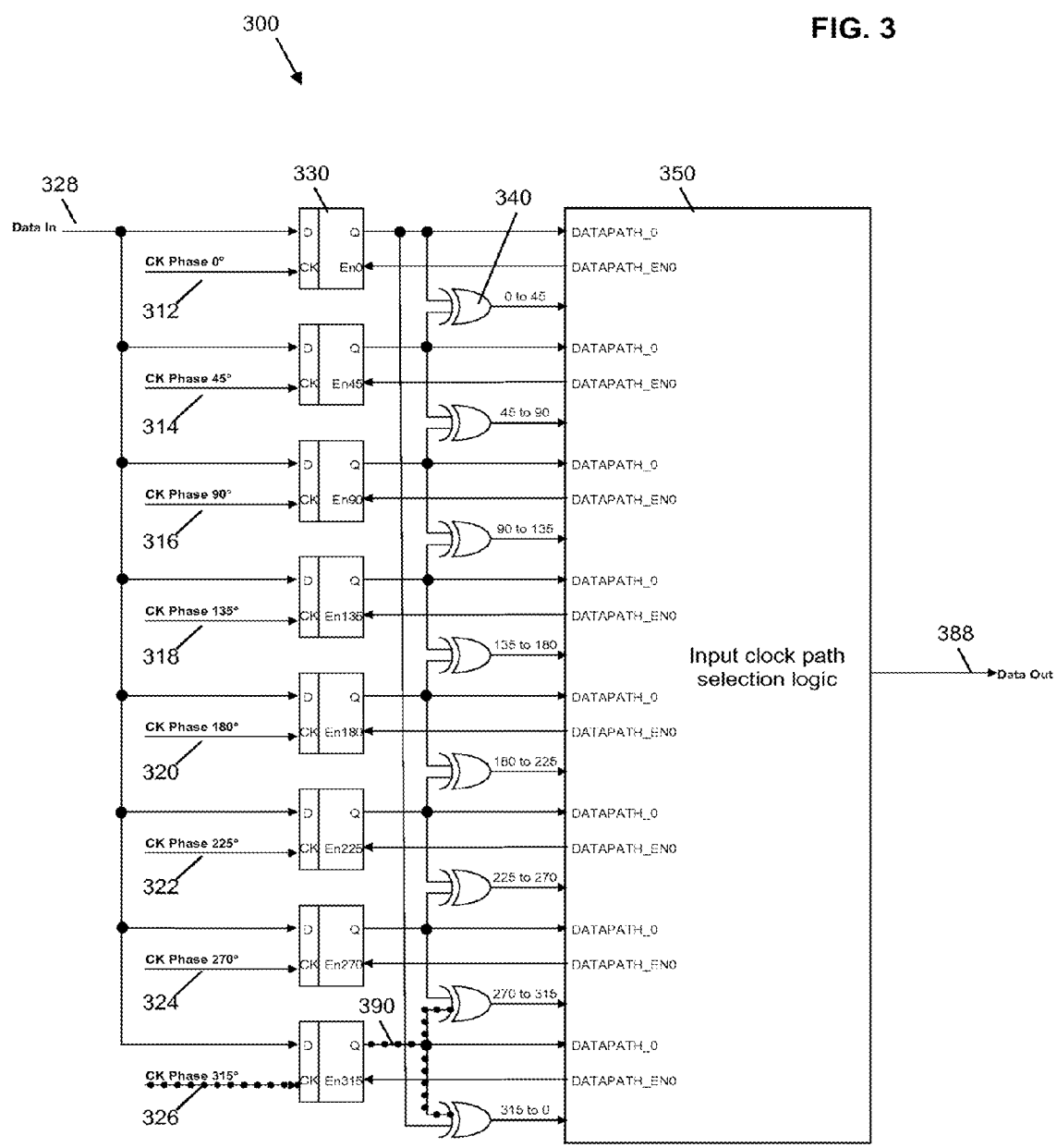
FIG. 3 illustrates a block diagram of an example of sampling logic.

Referring now to FIG. 3, a block diagram of an example of, sampling logic 300 is illustrated. Input data 328 from the Line Receiver is operably coupled to inputs (D) of eight sampler blocks, which for the illustrated example are in the form of eight flip-flops 330. It will be appreciated that instead of, an 8 sample phase CDR a different amount of sample phases may be used. The eight flip-flops 330 are operably coupled to eight input clock signals of equal clock period, but comprising nominally equi-spaced clock phases (approximately 45° separated) 312, 314, 316, 318, 320, 322, 324 and 326. Each flip-flop 330 samples the input data signal 328 in accordance with its respective clock signal 312 to 326, for example on each rising edge thereof. In this manner, each flip-flop 330 samples the input data signal once every clock cycle, with the sampling points of the eight flip-flops 330 being at substantially equidistant intervals within each clock cycle. For the illustrated embodiment, each flip-flop 330 comprises an output (O) comprising the sample of the input data signal 328. Each flip-flop 330 and its corresponding clock signal and output (O) make up an input sample path, such as sample path 390 for input clock signal 326. In the illustrated example, the sampling logic 300 comprises eight input sample paths.

The sampling logic 300 further comprises transition detection logic, which comprises a plurality of eXclusive OR (XOR) gates 340, and input sample path selection logic 350. The outputs (Q) of each pair of adjacent flip-flops 330, and thereby each pair of adjacent input sample paths, are operably coupled to the inputs of an XOR gate 340. In this manner, each XOR gate is arranged to perform an XOR comparison of input data samples to detect a transition between consecutive sample points within the input data signal, the sample points relating to the varying phases of the input clock signals. The outputs (Q) of the flip-flops 330, and thereby the input sample paths, along with the outputs of the XOR gates 340 are operatively coupled to the input sample path selection logic 350. The input sample path selection logic 350 is further coupled to an enabling input of each flip-flop 330, via which the input sample path selection logic 350 is able to individually enable and disable each flip-flop 330, and thereby each input sample path. Input sample path selection logic 350 further comprises sampled data output 388.

Figure 4:
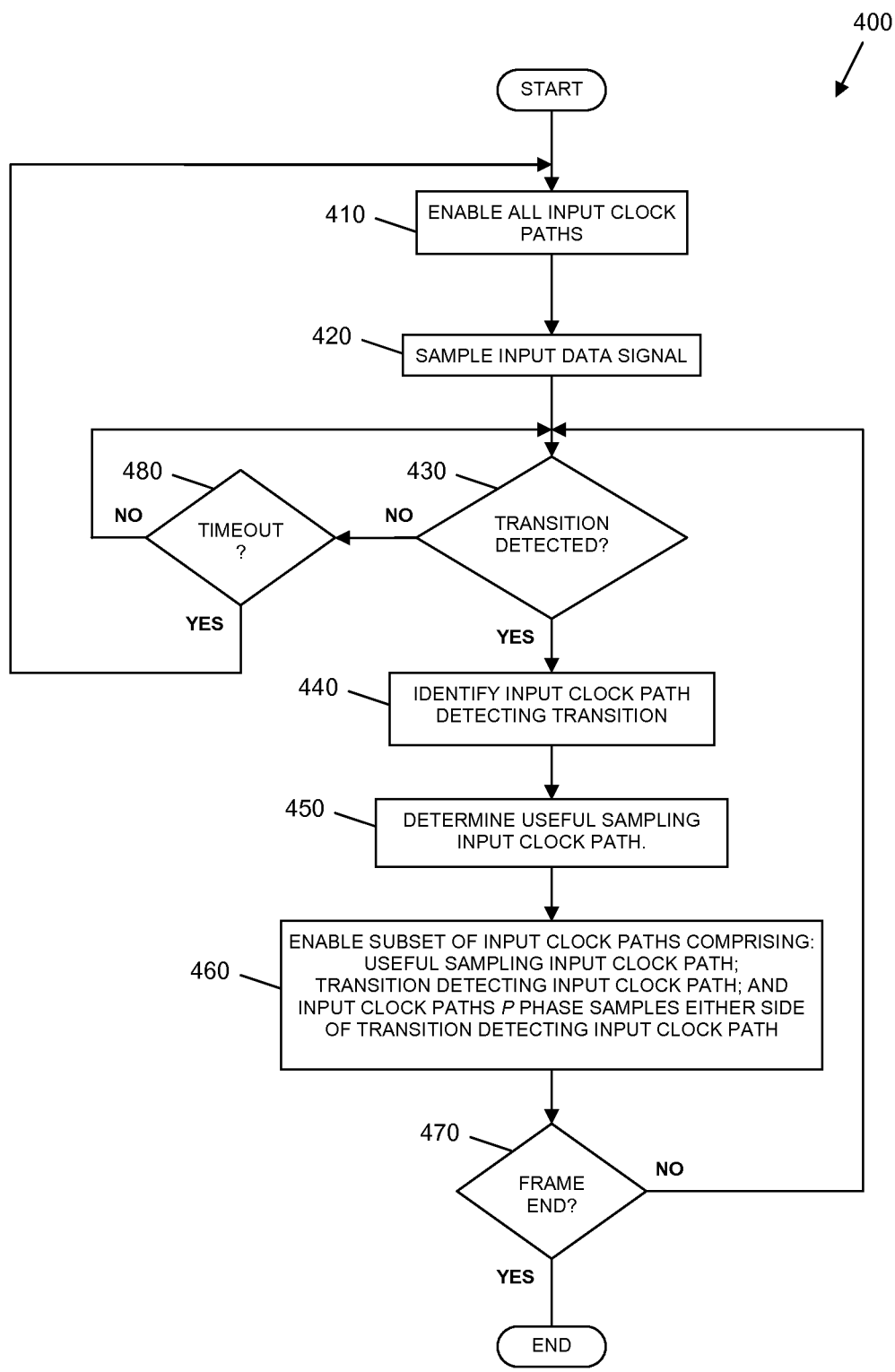
FIG. 4 illustrates a simplified flowchart of an example of a method of sampling data.

Referring now to FIG. 4, there is illustrated a simplified flowchart 400 of a method of sampling and cross-correlating data in an electronic device such as the wireless communication device 100 of FIG. 1 according to some embodiments of the invention. The method may comprise receiving an input data signal, enabling at least one input sample path, and sampling the received input data using the at least one input sample path. The method further comprises, upon detection of a transition within the received input data signal, determining if the phase of the at least one input sample path is a phase having a largest window between logic values, e.g. an optimally valid sample. It is envisaged that the sample point with the largest window between logic values, for example as illustrated in an eye diagram, may be considered as representing or corresponding to an approximate mid point in time of a data bit from the serial bit stream. In accordance with embodiments of the invention, the sample point with the largest window between logic values may be a range of sample points where the largest window is above a threshold value. In this regard, the largest window in the eye diagram may span a number of degrees of the sample phase. If it is determined that the phase of the at least one input sample path is not the phase having a largest window between logic values, at least one other input sample path with an optimally valid sample phase, for example a phase having a larger window between logic values, is required. In the context of the present invention, it is envisaged that the term optimally valid sample point encompasses at least a sample point that corresponds to the approximate mid point in time of a data bit from the serial bit stream. For clarity, a transition refers to a change in logical value within the input data signal, for example from a binary '0' value to a binary '1', or vice versa.

More specifically, in the example, illustrated in FIG. 4, the method starts, for example with a receipt of an input data signal, such as the start of a new frame, and moves to step 410 where all input sample paths are enabled. The term 'step' as used herein does not exclude that other steps are performed partially or completely overlapping in time, nor that the steps are performed in a particular order or implemented in a single action. For the example illustrated in FIG. 3, the input sample path selection logic 350 enables each flip-flop 330. Accordingly, each flip-flop 330 samples the input data signal 328 in accordance with its respective clock signal 312 to 326, for example on each rising edge thereof, as illustrated in step 420 of FIG. 4.

Next, in step 430, it is determined whether a transition is detected. As previously mentioned, for the example illustrated in FIG. 3, the outputs (Q) of each pair of adjacent flip-flops 330, and thereby each pair of adjacent input sample paths, are operably coupled to the inputs of an XOR gate 340. In this manner, if a pair of adjacent input sample paths comprise the same input data signal sample value, such as both comprising a binary '1' or '0', no transition has occurred within the received input signal between the two sampling points of the two adjacent input sample paths. Accordingly, the XOR gate 340 will output a '0' value, indicating to the input sample path selection logic 350 that no transition was detected.

Conversely, if a pair of adjacent input sample paths comprise different signal sample values, a transition has occurred within the received input signal between the two sampling points of the two adjacent input sample paths. Accordingly, the XOR gate 340 will output a '1' value, indicating to the input sample path selection logic 350 that a transition was detected.

If a transition is detected, in step 430 of FIG. 4, the method moves on to step 440, where the input sample path detecting the transmission is identified. For example, for the example of FIG. 3, the input sample path selection logic 350 receives an indication from one of the XOR gates 340 that a transition has been detected. The input sample path selection logic 350 identifies the particular XOR gate indicating the detection of a transition, and thereby determines the input sample path detecting the transmission, namely the input sample path coupled to the XOR gate 340 having the more delayed clock phase.

Having identified the input sample path detecting the transmission, the next step 450 in FIG. 4 comprises determining an appropriate or optimally valid sampling input sample path. For example, the input sample path detecting the transition in FIG. 3 comprises a clock phase for which the timing of the rising clock edge is just before the detected transition time of the input data signal. It should be noted that the signal may be sampled substantially midway between transitions, in order to avoid clock jitter and the like. Accordingly, for the example illustrated in FIG. 3, the input sample path selection logic 350 may determine an optimally valid or appropriate sampling input sample path by selecting the input sample path comprising a clock signal out of phase with the input sample path detecting the transition by a defined offset, for example 180°. The offset may, for example, be configurable. The sampling input sample path is subsequently used for sampling the received input data signal 328 to provide a sampled data output signal 388.

Next, in step 460, a subset of input sample paths is enabled, with the remaining input sample paths being disabled. For the illustrated embodiment, the subset of input sample paths comprises the optimally valid sampling input sample path, the input sample path that detected the last transition in the input data signal, and input sample paths P phase samples either side of the transition detecting input sample path. For example, one input sample path on either side of the transition detecting input sample path may be enabled.

In this manner, by enabling a subset of the input sample paths, and disabling all other input sample paths, the number of input sample paths operating and being controlled is reduced. As will be appreciated by a skilled artisan, by reducing the operational clocks phases required to sample the data correctly, power consumption can be substantially minimised.

Furthermore, by enabling the input sample paths on either side of the transition detecting input sample path, variations in timing of transitions within the input data signal, for example caused by clock jitter or the like, can be tolerated. The number of input sample paths (P) on either side of the transition detecting input sample path may be configurable, thereby enabling a size of the subset to be configured as required, and thereby providing a configurable balance mechanism between clock jitter tolerance and power consumption of the sampling logic 300.

Having enabled the subset of input sample paths, it is determined whether an end of frame has been received within the input data signal in step 470. If not the method loops back to step 430. Otherwise the method ends.

Referring back to step 430, if no transition is detected, the method moves to step 480, where it is determined how long it has been since a transition was last detected. If the length of time since a transition was last detected exceeds a 'time out' threshold, the method loops back to step 410, where all input sample paths are enabled. Otherwise, the method loops back to step 430. In this manner, if the length of time since a transition was last detected exceeds a threshold, it may be determined that the clock phases of the subset of input sample paths enabled do not correlate with the transitions within the input data signal. Consequently, upon the length of time exceeding the threshold, the method enables all clock phase data paths, allowing the transitions to be detected and the sampling logic 300 to be effectively re-synchronised with the input data signal.

Figure 5:
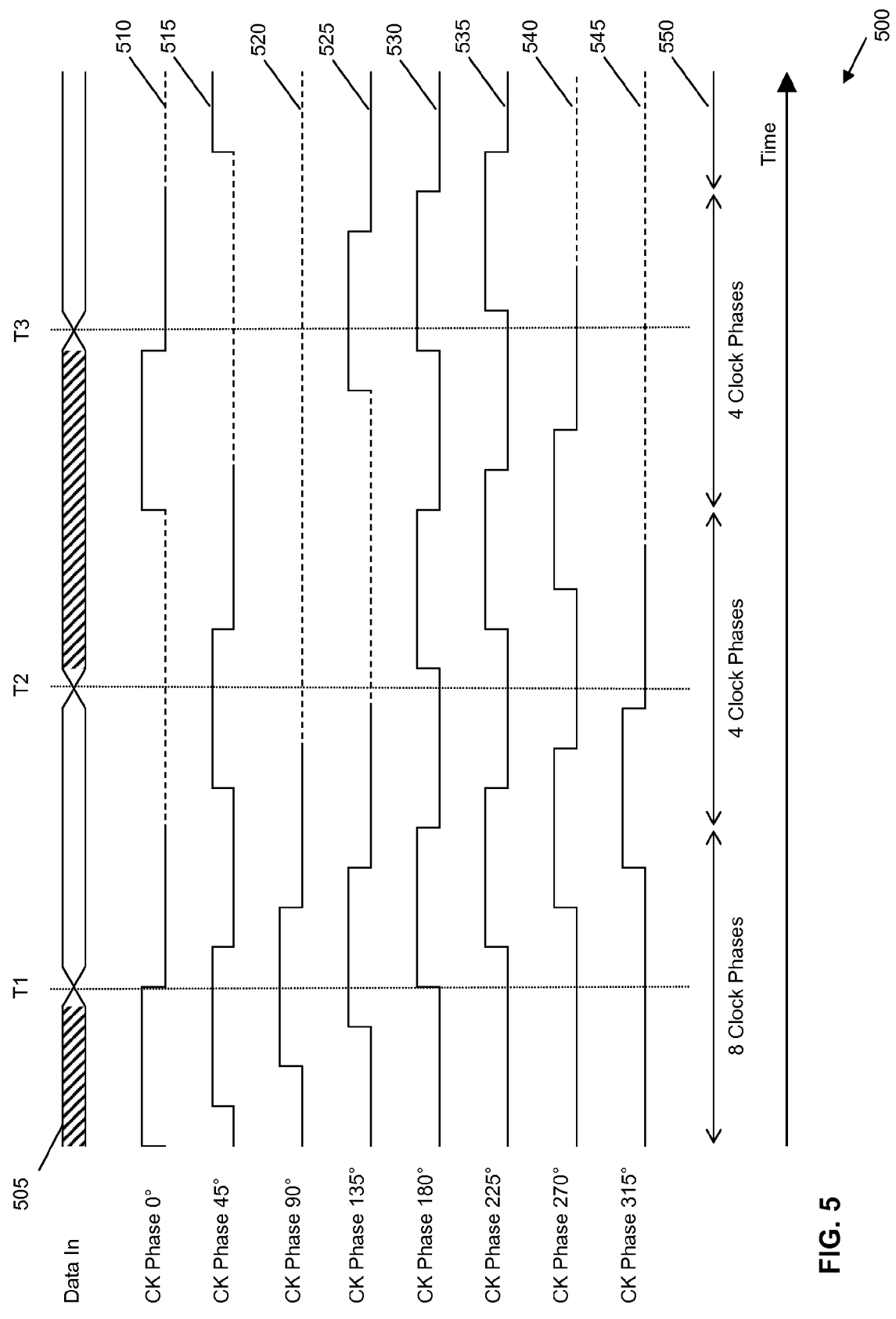
FIG. 5 illustrates an example of a timing diagram for sampling logic.

Referring now to FIG. 5, there is illustrated a timing diagram 500 for sampling logic according to some embodiments of the invention, such as the sampling logic 300 of FIG. 3 and the method illustrated in FIG. 4. An input data signal 505 is illustrated comprising three transition periods T1, T2 and T3. Also illustrated are eight equi-spaced sample clock signals 510, 515, 520, 525, 530, 535, 540, 545 and 550, approximately 45° separated in phase (in the illustrated embodiment), each associated with an input sample path.

In their initial states, for example prior to the first transition T1 of the input data signal 505, all eight input sample paths are enabled. Accordingly, each of the sample clock signals 510, 515, 520, 525, 530, 535, 540, 545 and 550 is enabled. Transition T1 occurs substantially concurrently with the rising edge of the 180° clock signal 530. Accordingly, in the case where each input sample path samples the input data signal 505 on the rising edge of its respective sample clock signal 510, 515, 520, 525, 530, 535, 540, 545 and 550, transition T1 will be detected, for example as described above with reference to the method of FIG. 4 and the sampling logic of FIG. 3, by the input sample path comprising the 225° clock signal 535.

Following detection of the transition T1, a sampling input sample path with a phase having a largest window between logic values, is determined. For example, as mentioned above, the signal may be sampled substantially midway between transitions, in order to avoid clock jitter and the like. Accordingly, the optimally valid or appropriate sampling input sample path may be determined by selecting the input sample path comprising a sample clock signal substantially 180° out of phase with the input sample path detecting the transition. Thus, for the embodiment illustrated in FIG. 5, an optimally valid or appropriate sampling input sample path following detection of the transition T1 may be the input sample path associated with the 45° clock signal 515.

Having determined the optimally valid or appropriate sampling input sample path, a subset of the input sample paths is enabled, with the remaining input sample paths being disabled. Following the detection of transition T1, the subset of input sample paths may comprise the optimally valid sampling input sample path (45° clock signal 515), the input sample path that detected the last transition in the input data signal (225° clock signal 535), and input sample paths either side of the transition detecting input sample path (180° clock signal 530 and 270° clock signal 540).

Transition T2 occurs just prior to the rising edge of the 180° clock signal 530, for example as a result of clock jitter. Accordingly, transition T2 will be detected, for example as described above with reference to the method of FIG. 4 and the sampling logic of FIG. 3, by the input sample path comprising the 180° clock signal 530. In the same way as following the transition T1, an optimally valid sampling input sample path is determined. Since the transition T2 was detected by the input sample path comprising the 180° clock signal 530, an optimally valid sampling input sample path following detection of the transition T2 may be the input sample path associated with the 0° clock signal 510.

Once again, having determined the phase that has a largest window between logic values, e.g. the optimally valid sampling input sample path, a subset of the input sample paths is enabled, with the remaining input sample paths being disabled. Following the detection of Transition T2, the subset of input sample paths may comprise the optimally valid sampling input sample path (0° clock signal 510), the input sample path that detected the last transition in the input data signal (180° clock signal 530), and input sample paths either side of the transition detecting input sample path (135° clock signal 525 and 225° clock signal 535).

Transition T3 occurs subsequent to the rising edge of the 180° clock signal 530. Accordingly, transition T3 will be detected, for example as described above with reference to the method of FIG. 4 and the sampling logic of FIG. 3, by the input sample path comprising the 225° clock signal 535. In the same way as following the transitions T1 and T2, an optimally valid or appropriate sampling input sample path is determined. Since the transition T3 was detected by the input sample path comprising the 225° clock signal 535, an optimally valid (appropriate) sampling input sample path following detection of the transition T3 may be the input sample path associated with the 45° clock signal 515.

Once again, having determined the optimally valid input sample path, a subset of the input sample paths are enabled, with the remaining input sample paths being disabled. Following the detection of Transition T3, the subset of input sample paths may comprise the optimally valid sampling input sample path (45° clock signal 515), the input sample path that detected the last transition in the input data signal (225° clock signal 535), and input sample paths either side of the transition detecting input sample path (180° clock signal 530 and 270° clock signal 540).

As can be seen, the illustrated examples provide dynamic tracking of input signal transitions, with fast convergence to appropriate sampling input sample paths, whilst being tolerant of clock and data jitter. Furthermore, by disabling all but a subset of input sample paths, power consumption may be reduced, thereby enabling battery call time and/or stand-by time to be improved, without increasing the separation between the phase samples (e.g. from 45° to 90°). Furthermore, by maintaining a small separation between the phase samples (e.g. 45°), the sampling and correlation logic hereinbefore described remains suitable for sampling high data rates.

It is further contemplated that, where the transmission of data across an interface is sufficiently stable, for example where clock jitter is sufficiently low, if it is determined that the phase of an input sample path is optimally valid following a plurality of consecutive samples, all input sample paths may be disabled apart from the optimally valid input sample path. In this manner, power consumption may be further reduced.

Figure 6:
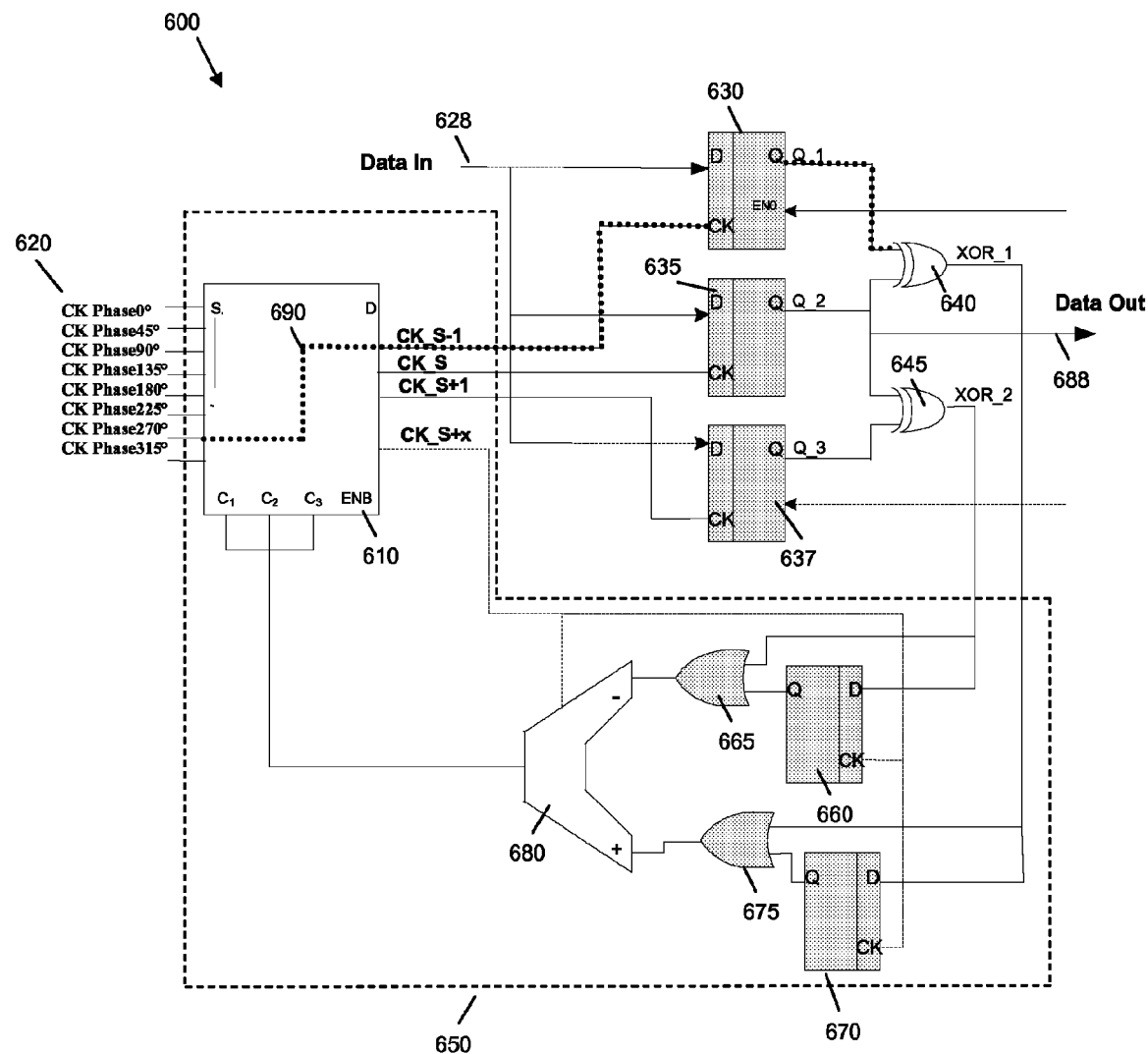
FIG. 6 illustrates a block diagram of an example of sampling logic.

Referring now to FIG. 6, there is illustrated a block diagram of another example of sampling logic 600. The sampling logic 600 comprises input sample path selection logic 650. The input sample path selection logic 650 comprises multiplexer 610, which for the illustrated embodiment is operably coupled to eight input clock signals 620 of equal clock period, but comprising nominally equi-spaced phase samples (approximately 45° separated).

Input data 628, for example from a Line Receiver, is operably coupled to inputs (D) of three sampler blocks, which for the illustrated embodiment are in the form of flip-flops 630, 635, 637. The three flip-flops are operably coupled to three sample clock signals CK_S−1, CK_S, CK_S+1 provided by multiplexer 610.

Each flip-flop 630, 635, 637 samples the input data signal 628 in accordance with its respective clock signal CK_S−1, CK_S, CK_S+1, for example on each rising edge thereof. In this manner, each flip-flop 630, 635, 637 samples the input data signal once every clock cycle, at varying time intervals.

The sampling logic 600 further comprises transition detection logic, which for the illustrated embodiment comprises eXclusive OR (XOR) gates 640, 645, flip-flops 630, 635, 637 and input sample path selection logic 650. Outputs (Q1, Q2) of flip-flops 630, 635 are operably coupled to the inputs of XOR gate 640. Outputs (Q2, Q3) of the flip-flops 635, 637 are operably coupled to the inputs of XOR gate 645. In addition, the output (Q2) of flip-flop 635 provides a sampled data output signal 688. The outputs (XOR_1, XOR_2) of the XOR gates 640, 645 are operably coupled to the input sample path selection logic 650.

For the embodiment illustrated in FIG. 6, the input sample path selection logic 650 comprises a modulo '8' accumulator 680, which is operably coupled to the outputs of the XOR gates 640, 645 via flip-flops 660, 670 and OR gates 665, 675. The output of the modulo '8' accumulator 680 is operably coupled to the multiplexer 610. As previously mentioned, the multiplexer 610 is operably coupled to eight input clock signals 620, and provides three sample clock signals CK_S−1, CK_S, CK_S+1. The modulo '8' signal from the accumulator 680 controls which of the eight input clock signals 620 are used to provide the three sample clock signals CK_S−1, CK_S, CK_S+1 to the flip flops 630, 635, 637.

For the embodiment illustrated in FIG. 6, each of the input clock signals 620, when used to provide, and thereby operably coupled to, one of the three sample clock signal paths (CK_S−1, CK_S, CK_S+1), forms an input sample path from the input clock signal 620, via the relevant sample clock signal path (CK_S−1, CK_S, CK_S+1) and flip-flop 630, 635, 637, to the relevant XOR gate 640, 645. For example, an enabled input sample path 690 is illustrated in FIG. 6, where the input clock signal 620 comprising a 270° phase offset is used to provide, and thereby operably coupled to, the sample clock signal CK_S−1. Accordingly, the sample path 690 comprises the input clock signal 620 comprising a 270° phase offset, the sample clock signal CK_S−1, flip-flop 630, and ends at XOR gate 640.

In this manner, the input sample path selection logic 650, and more particularly for the illustrated embodiment the multiplexer 610, is arranged to enable a subset of input sample paths, wherein the subset of input sample paths comprises a sampling input sample path, enabled on sample clock signal CK_S, and two comparison input sample paths, one comparison input sample path comprising a clock phase generally ahead of the clock phase for the sampling input sample path and enabled on sample clock signal CK_S−1, and one comparison input sample path comprising a clock phase generally behind the clock phase for the sampling input sample path and enabled on sample clock signal CK_S+1.

For the illustrated embodiment, the multiplexer 610 also provides a further clock signal CK_S+x to the accumulator 680 and flip-flops 660, 670, providing a timing signal therefor. Clock signal CK_S+x may also be provided using one of the eight input clock signals 620, based on the modulo 8 signal from the accumulator 680.

Figure 7:
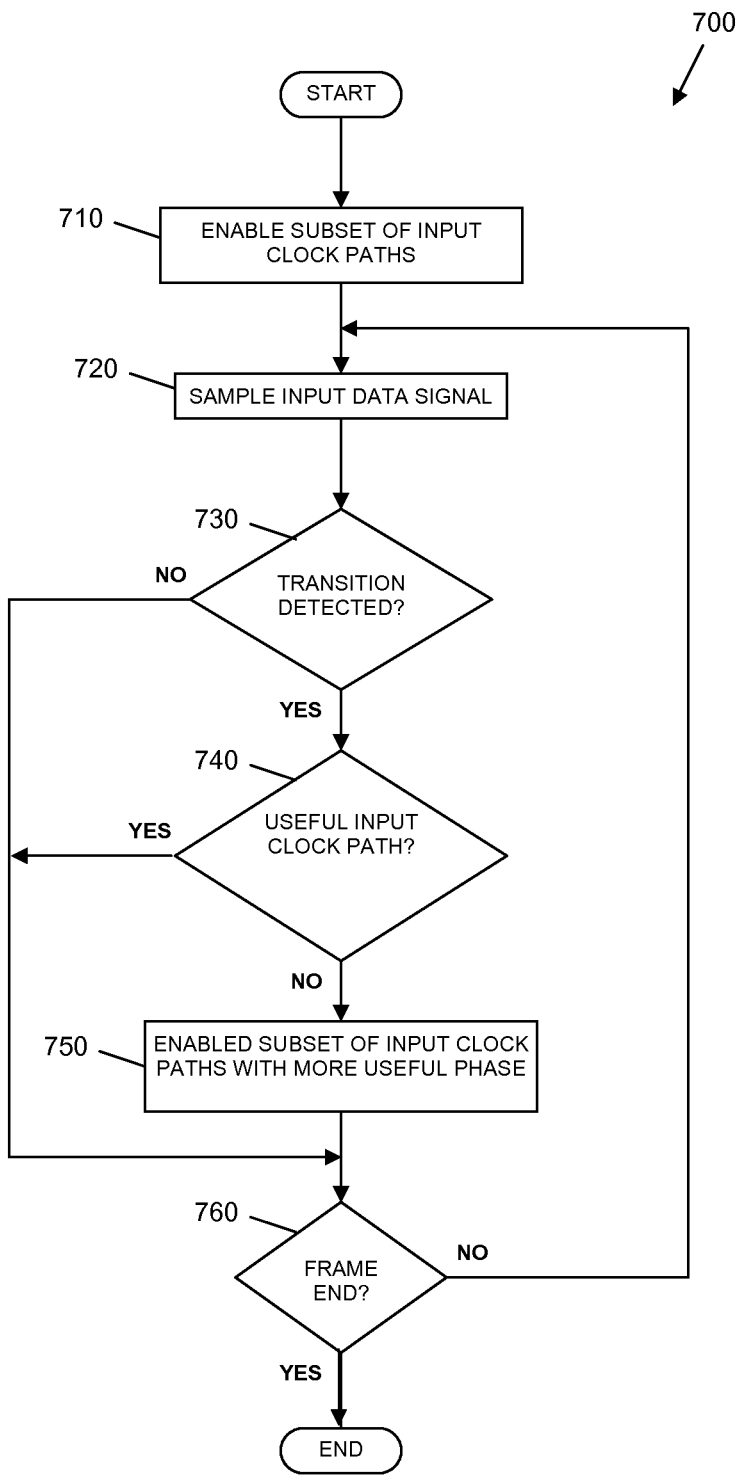
FIG. 7 illustrates a simplified flowchart of an example of a method of sampling data.

Referring now to FIG. 7, there is illustrated a simplified flowchart 700 of a method of sampling data in an electronic device such as the wireless communication device 100 of FIG. 1, according to some embodiments of the invention. The method starts, for example with a receipt of an input data signal, such as the start of a new frame, and moves to step 710, where a subset of input sample clock paths are enabled. Accordingly, for the embodiment illustrated in FIG. 6, the multiplexer 610 uses three of the received clock signals 620 to provide the sample clock signals CK_S−1, CK_S, CK_S+1. In this manner, the multiplexer 610 enables input sample paths relating to the three clock signals 620 used to provide the sample clock signals CK_S−1, CK_S, CK_S+1.

Having enabled a subset of the input sample paths, the method moves to step 720, where the input data signal is sampled. Thus, for the embodiment illustrated in FIG. 6, the flip-flops 630, 635, 637 sample the input data signal 628 in accordance with its respective clock signal CK_S−1, CK_S, CK_S+1, for example on the rising edge of the respective clock signal CK_S−1, CK_S, CK_S+1.

Next, in step 730 of FIG. 7, it is determined whether a transition is detected. For example, as previously mentioned, the outputs (Q1, Q2) of flip-flops 630, 635 of FIG. 6 are operably coupled to the inputs of XOR gate 640, and the outputs (Q2, Q3) of the flip-flops 635, 637 are operably coupled to the inputs of XOR gate 645. In this manner, XOR gate 640 will output a '1' value if it receives differing signals from the outputs (Q1, Q2) of flip-flops 630, 635. Accordingly, if a transition within the input data signal 628 occurs between the sampling points of flip-flops 630 and 635, the outputs of the flip-flops 630, 635 will differ, and accordingly, the XOR gate 640 will detect the difference, and output a '1' value. However, if no transition is detected, whereby the flip-flops 630, 635 output the same signal, then the XOR gate 640 will output a '0' value. Similarly, the XOR gate 645 will detect the presence of a transition within the input data signal 628 between the sampling points of flip-flops 635, 637, and output a '1' value if a transition is detected, and a '0' value if no transition is detected.

If no transition is detected in step 730, the method loops back to step 710. Otherwise, if a transition is detected, the method moves on to step 740, where it is determined whether the enabled input sample path(s) is/are optimally valid, for example whether the enabled input sample path(s) comprise appropriate phases that have a largest window between logic values.

For the embodiment illustrated in FIG. 6, the determination of whether the phase of one or more input sample path is the phase having a largest window between logic values is effectively performed at substantially the same time as detecting the transition (as will be appreciated by a skilled artisan, there will be some small degree of latency as they can not occur together instantly), and more particularly, the detection of a transition indicates that the phases of the enabled input sample paths are optimally valid. The input sample path selection logic 650 is arranged to determine that the phases of the input sample paths are optimally valid if the transition within the received input data signal 628 was detected between the sampling point for the sampling input sample path CK_S and the sampling point for one of the comparison input sample paths CK_S−1, CK_S+1.

As previously mentioned, a signal may be sampled substantially midway between transitions, for example using a sampling clock signal greater than 90° out of phase with the input data signal, in order to avoid clock jitter and the like.

Accordingly, for the embodiments illustrated in FIG. 6, in which the output Q2 of flip-flop 635 provides the sampled output data, detection of a transition between the sampling point of CK_S and the sampling point of either of CK_S−1 and CK_S+1 indicates that the sampling clock signal CK_S is less than 90° out of phase with the input data signal 628. In this manner, presence of a '1' value at either output XOR_1 or XOR_2 of the XOR gates 640, 645 not only indicates that a transition has been detected, but also that the phase of the sampling clock signal CK_S is not optimally valid, since it is less than 90° out of phase with the input data signal 628.

If it is determined that the enabled input sample path(s) is/are optimally valid, or a phase having a largest window between logic values, the method in FIG. 7 moves on to step 760. Otherwise, if it is determined that the enabled input sample path(s) is/are not optimally valid, the method moves on to step 750, where a subset of input sample paths comprising more optimally valid phases is enabled. For the embodiment illustrated in FIG. 6, this is achieved by way of the modulo '8' accumulator 680 incrementing or decrementing the modulo 8 output signal according to the output signals from the XOR gates 640, 645. The multiplexer 610 accordingly enables input sample paths relating to an alternative subset comprising, for the illustrated embodiment, three of the input clock signals 620, corresponding to the modulo 8 signal received from the accumulator 680. In particular, if it is determined that the phases of the input sample paths are not optimally valid, the input sample path selection logic 650 is arranged to enable a subset of input sample paths such that:

if the transition within the received input data signal 628 was detected between the sampling point for the sampling input sample path and the sampling point for the comparison input sample path comprising a clock phase generally ahead of that of the sampling input sample path, the phase of the sampling input sample path is decremented by one phase sample; and if the transition within the received input data signal 628 was detected between the sampling point for the sampling input sample path and the sampling point for the comparison input sample path comprising a clock phase generally behind that of the sampling input sample path, the phase of the sampling input sample path is incremented by one phase sample.

Having enabled a subset of input sample paths comprising more optimally valid phases, the method moves on to step 760, where it is determined whether an end of frame has been received within the input data signal. If it is not the frame end, in step 760, the method loops back to step 720. Otherwise the method ends.

Referring now to FIG. 8, there is illustrated a timing diagram 800 for sampling logic according to alternative embodiments of the invention, such as the sampling logic 600 of FIG. 6 and the method illustrated in FIG. 7. An input data signal 628 is illustrated comprising four transitions T1', T2', T3' and T4'. Also illustrated are eight equi-spaced input clock signals 620, approximately 45° separated, each associated with an input sample path.

Also illustrated are clock signals CK_S−1, CK_S, CK_S+1 and CK_S+x. As previously mentioned for the embodiment illustrated in FIG. 6, the clock signals CK_S−1, CK_S and CK_S+1 are sample clock signals provided to flip-flops 630, 635 and 637, and are provided by the multiplexer 610 using the eight input clock signals 620.

In particular each of the eight input clock signals 620 may be associated with a modulo '8' value, from '0 to 7'. For example, the input clock signal comprising a 0° phase offset may be associated with the value '0', the input clock signal comprising a 45° phase offset may be associated with the value '1', and so on through to the input clock signal comprising a 315° phase offset being associated with the value '7'. In this manner, the modulo '8' signal from the accumulator 680 comprises a value from '0 to 7', which directly relates to one of the eight input clock signals 620.

The multiplexer 610 may use the input clock signal 620 indicated by the modulo '8' signal to provide the CK_S sample clock signal, and may use input clock signals with phase offsets either side of the CK_S sample clock signal for CK_S−1 and CK_S+1 sample clock signals. For example, the CK_S−1 and CK_S+1 sample clock signals may be provided using the input clock signals that are −/+90° out of phase with the CK_S sample clock signal.

As also previously mentioned, clock signal CK_S+x may also be provided using one of the eight input clock signals 620, depending on the modulo '8' signal from the accumulator 680. For example, the CK_S+x clock signal may be provided using the input clock signal that is +135° out of phase with the CK_S sample clock signal. In this manner, the accumulator 680 and flip-flops 660, 670, which as previously mentioned use the CK_S+x as a timing signal, will be generally synchronised to read/sample their inputs after the flip-flops 630, 635 and 637 have sampled the input signal 628. In this manner, flip-flops 630, 635 and 637 are able to sample the input signal and settle prior to the flip-flops 660 and 670, and the accumulator 680 acts on the signals from the XOR gates 640, 645.

Also illustrated in FIG. 8 are output signals Q1, Q2 and Q3 of flip-flops 630, 635 and 637 respectively, along with outputs XOR_1 and XOR_2 of XOR gates 640 and 645 respectively.

In its initial state, for example prior to detection of transition T1', sample clock signal CK_S is provided using the input clock signal 620 having a 180° phase offset. As previously mentioned, for the illustrated embodiment sample clock signals CK_S−1 and CK_S+1 are provided using the input clock signals that are −/+90° out of phase with the CK_S sample clock signal. Accordingly, in their initial states, sample clock signals CK_S−1 and CK_S+1 are provided using the input clock signals 620 having a 90° phase offset and a 270° phase offset respectively. Additionally, clock signal CK_S+x is provided using the input clock signal 620 that has a 315° phase offset.

Transition T1', comprising a transition from a '0' value to a '1' value, occurs substantially concurrently with the rising edge of the sample clock signal CK_S. Consequently, only flip-flop 637 registers the transition T1' on the initial rising edge of the sample clock signal therefor. Accordingly, the outputs Q1 and Q2 of flip-flops 630 and 635 remain at '0' values, whilst output Q3 of flip-flop 637 changes to a '1' value.

Since the outputs Q1 and Q2 of flip-flops 630 and 635 remain the same, at '0' values, the output of XOR gate 640 also remains at a '0' value. However, the change of output Q3 of flip-flop 637 from a '0' value to a '1' value results in the outputs Q2 and Q3 having different values. Accordingly, the output XOR_2 of the XOR gate 645 becomes a '1' value.

The clock signal CK_S+x then triggers the accumulator 680 and flip-flops 660 and 670 to determine whether a transition has been detected by the XOR gates 640, 645. Accordingly, following transition T1', output XOR_2 of XOR gate 645 comprises a '1' value, indicating that the transition was detected between the sampling points of flip-flops 635 and 637.

As previously mentioned, a signal may be sampled substantially midway between transitions, for example using a sampling clock signal greater than 90° out of phase with the input data signal, in order to avoid clock jitter and the like. Accordingly, for the embodiments illustrated in FIGS. 6 and 8, in which the output Q2 of flip-flop 635 provides the sampled output data, detection of a transition between the sampling point of CK_S and the sampling point of either of CK_S−1 and CK_S+1 indicates that the sampling clock signal CK_S is less than 90° out of phase with the input data signal 628. In this manner, the presence of a '1' value at either output XOR_1 or XOR_2 of the XOR gates 640, 645 not only indicates that a transition has been detected, but also that the phase of the sampling clock signal CK_S is not optimally valid, since it is less than 90° out of phase with the input data signal 628.

Accordingly, for the embodiment illustrated in FIG. 8, the presence of a '1' value at the output XOR_2 of XOR gate 645 causes the accumulator 680 to decrement the modulo 8 signal value provided to the multiplexer 610. By decrementing the modulo 8 signal, the accumulator 680 causes the multiplexer 610 to enable a subset of input sample paths comprising more optimally valid clock phases. More particularly, the multiplexer 610 changes the input clock signal 620 used for providing the sample clock signal CK_S to the input clock signal 620 corresponding to the new, decremented modulo 8 value, which for the illustrated embodiment is the input clock signal 620 having a 135° offset. Furthermore, the multiplexer 610 also 'decrements' the input clock signals 620 used for providing the sample clock signals CK_S−1 and CK_S+1, which become input clock signals 620 having 45° and 135° offsets respectively, as well as the clock signal CK_S+x, which becomes input clock signal 620 having a 0° offset.

Transition T2' occurs subsequent to the next rising edge of the sample clock signal CK_S, but prior to the rising edge of the sample clock signal CK_S+1. Consequently, flip-flops 630 and 635 register transition T1' on the rising sample clock signal edge therefor, whilst flip-flop 637, having previously registered transition T1', now registers transition T2'. Accordingly, the outputs Q1 and Q2 of flip-flops 630 and 635 change to '1' values, whilst output Q3 of flip-flop 637 changes to a '0' value.

Although the outputs Q1 and Q2 of flip-flops 630 and 635 change to '1' values, the output of XOR gate 640 remains at a '0' value since outputs Q1 and Q2 have matching values. However, the change of output Q3 of flip-flop 637 from a '1' value to a '0' value results in the outputs Q2 and Q3 having different values. Accordingly, the output XOR_2 of the XOR gate 645 again becomes a '1' value.

The clock signal CK_S+x then triggers the accumulator 680 and flip-flops 660 and 670 to determine whether a transition has been detected by the XOR gates 640, 645. Accordingly, following transition T2' output XOR_2 of XOR gate 645 comprises a '1' value, indicating that the transition was detected between the sampling points of flip-flops 635 and 637. Consequently, the accumulator 680 again decrements the modulo 8 signal, causing the multiplexer 610 to change the input clock signals 620 used to provide the sample clock signals CK_S, CK_S−1 and CK_S+1, as well as the clock signal CK_S+x. Thus, the phase offsets of the input clock signal 620 used to provide the sample clock signals become 90°, 0° and 180° for sample clock signals CK_S, CK_S−1 and CK_S+1 respectively. In addition, the phase offset of the input clock signal 620 used to provide the clock signal CK_S+x becomes 225°.

Transition T3' occurs subsequent to the next rising edge of the sample clock signal CK_S+1. Consequently, flip-flops 630 and 635 register transition T2' on the rising sample clock signal therefor, whilst flip-flop 637, having already registered transition T2', registers no transition. Accordingly, the outputs Q1, Q2 and Q3 of flip-flops 630, 635 and 637 are all set to '0' values. Since the outputs Q1, Q2, Q3 of all three flip-flops 630, 635, 637 are the same, both of the outputs XOR_1, XOR_2 of the XOR gates 640, 645 are set to '0' values.

The clock signal CK_S+x then triggers the accumulator 680 and flip-flops 660, 670 to determine whether a transition has been detected by the XOR gates 640, 645. Since the outputs XOR_1 and XOR_2 of the XOR gates 640, 645 both comprise '0' values, the accumulator 680 and flip-flops 660, 670 determine that no transition has been detected, and consequently, as explained above, that the phase of the sampling clock signal CK_S is considered to have a larger window between logic values, for example be an optimally valid phase. Consequently, the accumulator 680 does not modify the modulo 8 signal, and thus the multiplexer keeps the same subset of input sample paths enabled by using the same input clock signals 620 to provide the sample clock signals CK_S, CK_S−1 and CK_S+1, as well as the clock signal CK_S+x.

Since the phases of the sample clock signals CK_S, CK_S−1 and CK_S+1 have not been changed, transition T4' also occurs subsequent to the next rising edge of the sample clock signal CK_S+1. Consequently, all three flip-flops 630, 635 and 637 register transition T3' on the rising sample clock signal therefor. Accordingly, the outputs Q1, Q2 and Q3 of flip-flops 630, 635 and 637 are all set to '1' values. Since the outputs Q1, Q2, Q3 of all three flip-flops 630, 635, 637 are the same, both of the outputs XOR_1, XOR_2 of the XOR gates 640, 645 are set to '0' values.

The clock signal CK_S+x then triggers the accumulator 680 and flip-flops 660, 670 to determine whether a transition has been detected by the XOR gates 640, 645. Once again, since the outputs XOR_1 and XOR_2 of the XOR gates 640, 645 both comprise '0' values, the accumulator 680 and flip-flops 660, 670 determine that no transition has been detected, and consequently, as explained above, that the phase of the sampling clock signal CK_S is optimally valid. Consequently, the accumulator 680 does not modify the modulo 8 signal, and thus the multiplexer keeps the same subset of input sample paths enabled by using the same input clock signals 620 to provide the sample clock signals CK_S, CK_S−1 and CK_S+1, as well as the clock signal CK_S+x.

As previously mentioned, it is further contemplated that, where the transmission of data across an interface is sufficiently stable, for example where clock jitter is sufficiently low, if it is determined that the phase of an input sample path has a largest window between logic values (such as a logical '1' and a logical '0'), for example a phase considered to be optimally valid following a plurality of consecutive samples, all input sample paths may be disabled apart from the optimally valid input sample path. In this manner, power consumption may be further reduced.

It will be appreciated by a skilled artisan that the invention is independent from any explicit architectures used, and the usage of specific architectures in the described embodiments are only for illustrative purposes.

Also, the method and apparatus for sampling data may be applied by a semiconductor manufacturer to any integrated circuit architecture supporting data sampling logic. It is further envisaged that, for example, a semiconductor manufacturer may employ the features in a design of a stand-alone device, or application-specific integrated circuit (ASIC) and/or any other sub-system element.

It will be appreciated that any suitable distribution of functionality between different functional units or controllers or logic elements or memory elements, may be used without detracting from the embodiments herein described. Hence, references to specific functional devices or elements are only to be seen as references to suitable means for providing the described functionality, rather than indicative of a strict logical or physical structure or organization. By way of example, sampler logic blocks coupled to transition detection logic have been illustrated and described as separate functional elements of the system. However, it is envisaged that sampler logic blocks and transition detection logic may be provided within combined functional elements.

Aspects of the invention may be implemented in any suitable form including hardware, software, firmware or any combination of these. The elements and components of an embodiment of the invention may be physically, functionally and logically implemented in any suitable way. Indeed, the functionality may be implemented in a single unit or IC, in a plurality of units or ICs or as part of other functional units.

Although the invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second' etc. do not preclude a plurality.

The invention claimed is:

1. A semiconductor device for sampling data in a serial data stream in an electronic device, comprising:
sampling logic, comprising:
input sample path selection logic arranged to enable at least one input sample path;
sampler logic arranged to receive and sample an input data signal in a serial data stream in accordance with a phase of the at least one enabled input sample path; and
transition detection logic arranged to detect transitions within the received input data signal;
wherein the input sample path selection logic is further arranged, upon detection of a transition within the received input data signal, to determine if the phase of the at least one input sample path is a phase having a largest window between logic values; and if it is determined that the phase of the at least one input sample path is not the phase having a largest window between logic values to enable at least one further input sample path comprising a phase having a larger window between logic values, wherein, if it is determined that the phase of the at least one input sample path is optimally valid over a plurality of consecutive samples, the input sample path selection logic is arranged to disable all input sample paths apart from the optimally valid input sample path, wherein the input sample path selection logic is arranged to enable a subset of input sample paths, wherein the subset of input sample paths comprises a sampling input sample path, and at least two comparison input sample paths, one comparison input sample path comprising a clock phase ahead of the clock phase for the sampling input sample path, and one comparison input sample path comprising a clock phase behind the clock phase for the sampling input sample path, wherein the input sample path selection logic is arranged to determine that a phase of the input sample paths is not the phase having a largest window between logic values if a transition within the received input data signal is detected between a sampling point for the sampling input sample path and a sampling point for one of the comparison input sample paths.

2. The semiconductor device of claim 1, wherein the subset of input sample paths comprise clock signals of nominally equi-spaced phase samples.

3. The semiconductor device of claim 1, wherein the input sample path selection logic is arranged to enable a subset of eight input sample paths comprising clock signals of nominally 45° separated phases.

4. The semiconductor device of claim 1, wherein the transition detection logic comprises a plurality of logic gates arranged to perform an XOR comparison of input data samples to detect a transition between consecutive sample points within the input data signal.

5. The semiconductor device of claim 1, wherein the subset of input sample paths comprises a transition detecting input sample path, and input sample paths a number of phase samples either side of the transition detecting input sample path.

6. The semiconductor device of claim 5, wherein the input sample path selection logic is arranged to determine that a phase of the input sample paths is not the phase having a largest window between logic values if the transition within the received input data signal is not detected within the transition detecting input sample path sample.

7. The semiconductor device of claim 6, wherein the input sample path selection logic is arranged to enable a subset of input sample paths, if it is determined that the phase of the input sample path is not the phase having the largest window between logic values.

8. The semiconductor device of claim 5, wherein the subset of input sample paths further comprises a sampling input sample path for sampling the received input data signal to provide a sampled data output signal, the sampling input sample path comprising a clock phase approximately 180° out of phase with the clock phase of the transition detecting input sample path.

9. The semiconductor device of claim 1, wherein the subset of input sample paths initially comprises all available input sample paths.

10. The semiconductor device of claim 1, wherein the at least two comparison input sample paths comprise clock phases approximately 90° separated from the sampling input sample path.

11. The semiconductor device claim 1, wherein if it is determined that a phase of the input sample paths is not the phase having a largest window between logic values, the input sample path selection logic is arranged to enable a subset of input sample paths such that:
if the transition within the received input data signal is detected between the sampling point for the sampling input sample path and the sampling point for the comparison input sample path comprising a clock phase ahead of that of the sampling input sample path, the phase of the sampling input sample path is decremented by one phase sample.

12. The semiconductor device of claim 1, wherein if it is determined that a phase of the input sample paths is not the phase having a largest window between logic values, enabling a subset of input sample paths such that if the transition within the received input data signal is detected between the sampling point for the sampling input sample path and the sampling point for the comparison input sample path comprising a clock phase generally behind that of the sampling input sample path, the phase of the sampling input sample path is incremented by one phase sample.

13. The semiconductor device of claim 1, wherein the sampling input sample path is used for sampling the received input data signal to provide a sampled data output signal.

14. The semiconductor device of claim 1, wherein the input data signal is received over a BaseBand Integrated Circuit to Radio Frequency Integrated Circuit interface.

15. A wireless communication device, comprising a semiconductor device according to claim 1.

16. The semiconductor device of claim 10, wherein the input sample path selection logic is arranged to determine that a phase of the input sample paths is not the phase having a largest window between logic values if a transition within the received input data signal is detected between a sampling point for the sampling input sample path and a sampling point for one of the comparison input sample paths.

17. The semiconductor device of claim 11 wherein the sampling input sample path is used for sampling the received input data signal to provide a sampled data output signal.

18. A method for sampling data in a serial data stream in an electronic device, comprising:
   receiving an input data signal in a serial data stream;
   enabling a subset of input sample paths comprising a sampling input sample path, and at least two comparison input sample paths, one comparison input sample path comprising a clock phase ahead of the clock phase for the sampling input sample path, and one comparison input sample path comprising a clock phase behind the clock phase for the sampling input sample path;
   sampling the received input data in the serial data stream in accordance with a phase of the sampling input sample path; and
   detecting transitions within the received input data signal, upon detection of a transition within the received input data signal, determining if the phase of the sampling input sample path is a phase having a largest window between logic values, wherein the determining is based on whether the transition within the received input data signal is detected between a sampling point for the sampling input sample path and a comparison sampling point for one of the comparison input sample paths; and
   if it is determined that the phase of the at least one input sample path is not the phase having a largest window between logic values, enabling at least one further input sample path comprising a phase having a larger window between logic values.

19. A method for sampling data in a serial data stream in an electronic device, comprising:
   receiving an input data signal in a serial data stream;
   initially enabling a plurality of input clock paths;
   sampling the received input data in the serial data stream in accordance with respective phases of the plurality of input clock paths;
   detecting a transition within the received input data signal in response to the sampling,
   determining a sampling input clock path in response to the detecting;
   further sampling the received input data in the serial data stream in accordance with a phase of the sampling input sample path;
   upon the detection of the transition within the received input data signal, determining if the phase of the sampling input path is a phase having a largest window between logic values based on detecting whether the transition within the received input data signal is between a sampling point for the sampling input sample path and a comparison sampling point for one of the comparison input sample paths;
   in response to the determining, enabling a subset of the input sample paths comprising a sampling input sample path, and at least two comparison input sample paths, one comparison input sample path comprising a clock phase ahead of the clock phase for the sampling input sample path, and one comparison input sample path comprising a clock phase behind the clock phase for the sampling input sample path; and
   in response to the determining, disabling remaining input sample paths of the input sample paths not included in the subset, wherein the disabling reduces power consumption of the electronic device.

* * * * *